United States Patent [19]
Clarke et al.

[11] Patent Number: 5,793,752
[45] Date of Patent: Aug. 11, 1998

[54] DISCOVERY METHOD FOR DETERMINING INFORMATION ABOUT A SIGNALLING NETWORK

[75] Inventors: David Alan Clarke; Jan Schiefer, both of Bristol, United Kingdom

[73] Assignee: Hewlett-Packard Company, Palo Alto, Calif.

[21] Appl. No.: 604,066

[22] Filed: Feb. 20, 1996

[30] Foreign Application Priority Data

Apr. 11, 1995 [EP] European Pat. Off. ............ 95302382

[51] Int. Cl.$^6$ .................................................... H04J 1/16
[52] U.S. Cl. .................................................... 370/252
[58] Field of Search ............... 370/17, 13, 94.1, 370/94.2, 85.13, 60, 60.1, 110.1, 241, 252, 329, 331, 333, 339, 341, 346, 431, 437, 464, 465, 469, 522, 524; 379/12, 23, 225, 219, 229, 231, 232, 234; 455/437, 436, 439, 517, 524

[56] References Cited

U.S. PATENT DOCUMENTS

| 5,142,528 | 8/1992 | Kobayashi et al. ............ 370/469 |
| 5,278,890 | 1/1994 | Beeson et al. ............... 370/94.1 |
| 5,333,183 | 7/1994 | Herbert ....................... 379/112 |

FOREIGN PATENT DOCUMENTS 0621734 10/1994 European Pat. Off.
9014725 11/1990 WIPO.
9206547 4/1992 WIPO.

OTHER PUBLICATIONS

Nachrichten Elektronik Und Telematik, vol. 47, No. 6, Jun. 1993 Heidelberg DE, pp. 258–259 XP 000378609 Rosa 'Kommunikation sichern' *the whole document*.

*Primary Examiner*—Dang Ton
*Attorney, Agent, or Firm*—Ladas & Parry

[57] ABSTRACT

A network discovery method is provided for determining the functionality existing at the nodes of a signalling network. Such a network typically comprises a plurality of nodes (BSC, MSC, GSMC, HLR, VLR, EIR) each exhibiting one or more types of functionality, and point-to-point links inter-connecting the nodes and carrying messages exchanged between nodes, the messages having characteristics dependent on the nature of the functionality of the nodes between which they are exchanged. The discovery method involves using probes and a central station to monitor one or more links and to identify from at least one message associated with a particular node, a predetermined set of message characteristics sufficient to identify a type of node functionality possessed by that node. The predetermined set of message characteristics may be derived from a single message, from several messages on the same or different links, or by observing the message transfer characteristics of the node concerned.

16 Claims, 5 Drawing Sheets

DISCOVERY METHOD FOR DETERMINING INFORMATION ABOUT A SIGNALLING NETWORK

TECHNICAL FIELD

The present invention relates to a network discovery method for determining information about a signalling network that comprises a plurality of network nodes interconnected by point-to-point links.

The present invention is applicable, without limitation, to signalling networks operating substantially in accordance with Signalling System No.7, whether as specified by the CCITT, ANSI, ETSI (for GSM), Bellcore or similar body. The CCITT Signalling System Number 7 is specified in Recommendations Q.700-Q.716 CCITT Volume VI-Fascicle VI.7, Geneva 1989, ISBN 92-61-03511-6. Except as otherwise required by the context, as used herein the term "SS7 network" should be taken as referring to any variant of Signalling System No. 7 including variants in which the physical and link level layers are replaced by an alternative link technology such as one based on ATM (asynchronous transfer mode).

BACKGROUND ART

In modern communications technology it has become common practice to provide two related but separate network infrastructures: a transmission network for carrying end-user data traffic, and a signalling network for controlling operation of the transmission network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentionned Signalling System No. 7 (SS7) which is being extensively deployed for control of telephone and other data transmission networks. An SS7 network basically comprises signalling points (nodes) interconnected by signalling links, each node having an associated functionality (for example, service control point functionality, signalling transfer functionality, etc).

In order to be able to carry out independent monitoring of the signalling network, monitor probes may be temporarily or permanently installed on one or more links to monitor messages flowing on the link or links. By monitoring these messages it is possible to gain an insight into the behaviour of the network and to detect faults. One example of a monitor probe is the Hewlett-Packard 37900B Signalling Test Set.

When a monitor probe is permanently or semi-permanently installed on a link, generally provision is made to have the probe send the results of its monitoring operations automatically to a remote management station; this station may also be able to control the probe to change the focus of its monitoring activities. Of course, for the results coming from a probe to be useful to the management station, the location of the probe, in terms of the absolute identity of the link on which it is installed, must be made known to the management station. Our co-pending European patent application No. 93309780-0 (which corresponds to U.S. Pat. No. 5,521,902) describes a discovery method by which a monitor probe can automatically determine the absolute identity of the link on which it is installed.

Generally, of course, the information derived from a monitor probe, including its network location, is only useful to a central operator if the configuration of the signalling network is already known. However, the continuing growth and evolution of the telecommunications infrastructure, not least in the area of mobile networks, has made the maintenance of an up-to-date record of the associated signalling network a substantial task particularly if it is desired to have immediate access at all times to the latest structure of the signalling network.

It is an object of the invention to provide assistance in establishing information about the current composition of a signalling network.

SUMMARY OF THE INVENTION

According to one aspect of the present invention, there is provided a network discovery method for determining information about a signalling network that comprises a plurality of network nodes interconnected by point-to-point links, the nodes having respective network addresses on the signalling network and each having at least one of a plurality of different types of node functionality, and the links serving to carry messages that are associated with different ones of said types of node functionality and have characteristics dependent thereon, said messages also including addressing information associating the messages with specific nodes; said method involving:

(a) monitoring at least one said link to identify from at least one message associated with a particular said node, a predetermined set of message characteristics sufficient to identify a said type of node functionality possessed by said particular node, (b) providing an output associating the type of functionality identified by said set of characteristics with said particular node.

The aforesaid predetermined set of message characteristics may be derived from a single message, this message being one for which the said particular node constitutes either the final destination node or the originating source node of the message according to the addressing information of the message. Where the signalling network is an SS7 signalling network, the predetermined set of message characteristics may comprise a predetermined subsystem number in the SCCP layer of the message or a predetermined type of message component of the message. In particular, where the signalling network forms the signalling network of a GSM-type system, the predetermined message component may be a BSSMAP or MAP message component.

The aforesaid predetermined set of message characteristics may, alternatively, be built up from characteristics derived from a plurality of different messages. Thus, where the network is an SS7 signalling network, the set of message characteristics may comprise the types of user and application parts obsrved for a plurality of different messages associated with the node concerned.

In one embodiment of the invention, the aforeasaid set of message characteristics is indicative of a transfer characteristic of a node, this transfer characteristic being indicative of the node functionality and being derived by observing messages both going to and coming from the node concerned.

Whilst it would be possible to pick up information about a node anywhere on the network where a message orignating from or going to that node may appear, it is preferred to determine the functionality of a particular node by monitoring messages on at least one said link directly connected to that node (indeed, in practice, this is often the only place where it is possible to observe messages relevant to the node concerned.) In the case of a SS7 signalling network, a message may be identified as having the required association with a node by checking that:

the message has as its originating/destination point code the point code of a node at one end of the link on which the message is monitored, and where the message has an SCCP component, the Global Title translation indicator of the message is not set.

BRIEF DESCRIPTION OF THE DRAWINGS

A node-discovery method embodying the invention will now be described, by way of non-limiting example, with reference to the accompanying drawings, in which.

BEST MODE FOR CARRYING OUT THE INVENTION

A node-functionality discovery method embodying the invention is decribed below in elation to an SS7 signalling network used to control a mobile radio system. In order to facilitate an understanding of the node-functionality discovery method, a description will first be given of the main features of the mobile radio system and of the SS7 signalling architecture.

EXAMPLE SIGNALLING-NETWORK ENVIRONMENT

Figure 1:
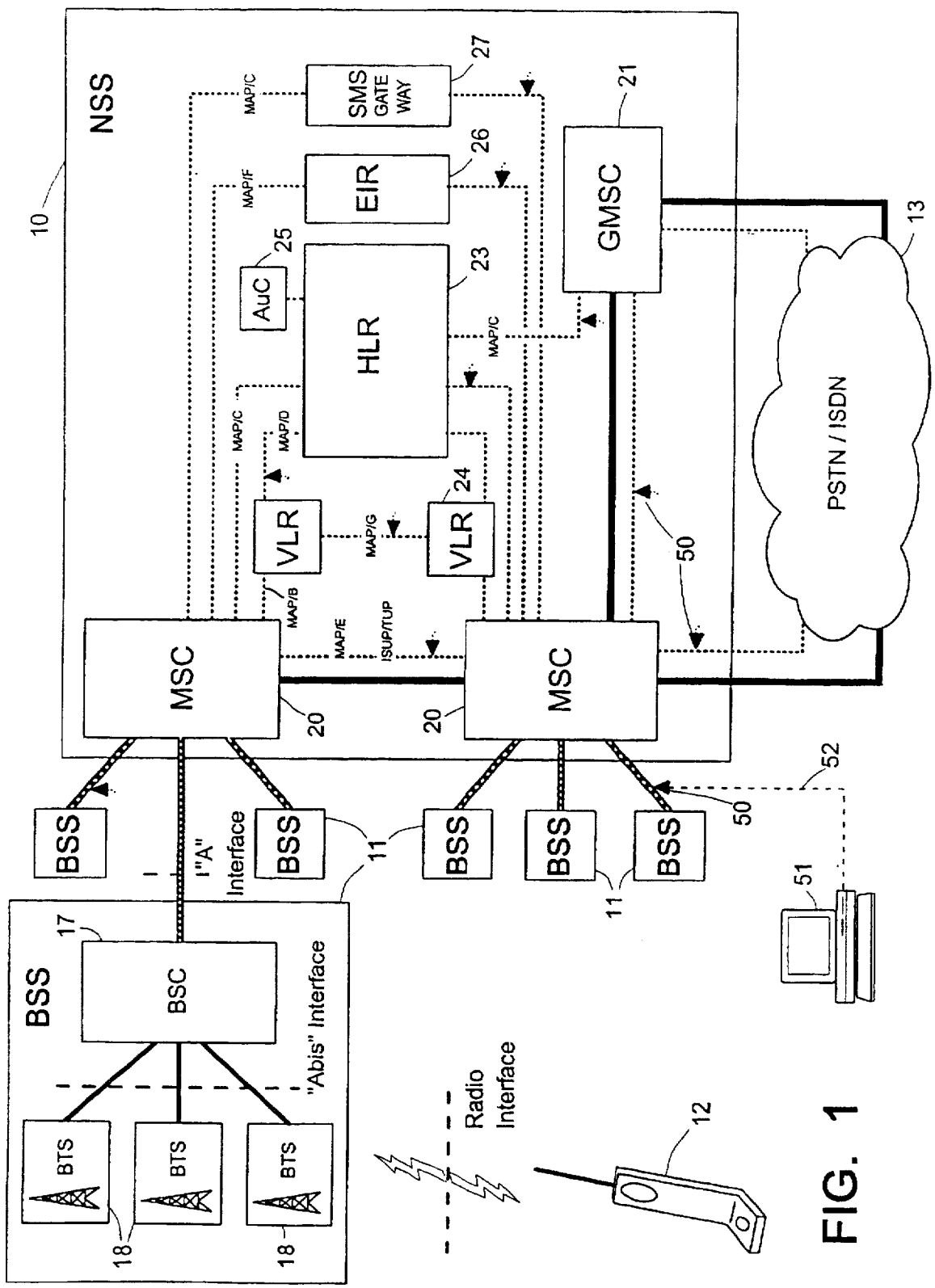
FIG. 1 is a block diagram showing the main components of a GSM cellular mobile radio system.

FIG. 1 is a diagram showing the main elements of a public land mobile network (PLMN) based on digital cellular radio technology; in particular, the FIG. 1 network is a GSM network.

The FIG. 1 network comprises a network and switching subsystem (NSS) 10 which connects with a plurality of base station subsystems (BSS) 11; the BSS provide radio communication with mobile stations 12 (only one of which is shown in FIG. 1). The NSS 10 also communicates with the fixed public network 13 (the public switched telephone network PSTN and integrated digital services network ISDN). Indeed the PLMN can be thought of as an access path to the PSTN/ISDN, though calls may also be wholly contained within the PLMN.

Each BSS 11 comprises a base station controller (BSC) 17, and a plurality of base transceiver stations (BTS) 18 each controlled by the BSC 17. Each BTS 18 has radio transmitters and receivers for providing radio coverage of a local area known as a 'cell'.

Signalling and user data (digitised voice and other digital data such as computer data) pass between each mobile station 12 and the BTS 18 of the cell in which the mobile station is located. As a mobile station moves from one cell to another, control of handover of communication with the mobile station from the BTS of the old cell to the BTS of the new cell, is effected by the BSC.

The radio interface between a mobile station and BTS is standardised within a particular system such as GSM. Similarly, the interface between each BTS 18 and its associated BSC 17, by which user data and signalling are exchanged between these elements, is also generally standardised (in GSM, this interface is known as the 'Abis' interface).

Each BSS 11 communicates with a mobile switching centre (MSC) 20 of the NSS 10, each MSC 20 generally being in communication with several BSS. The interface between a BSS and an MSC is again generally standardised, this interface being known as the 'A' interface in GSM.

In GSM networks, user data and signalling are multiplexed across the radio interface, the 'Abis' interface and the 'A' Interface. However, within the NSS, user data and signalling are handled separately. This is shown in FIG. 1 by depicting user-data paths in solid lines and signalling paths in dotted lines; when both use the same path, a solid line with superimposed white dots is used.

In the NSS, the user data is handled by the MSCs and for a given call, the user data will commonly traverse two MSCs 20. Although in FIG. 1 the MSCs 20 are shown as directly connected by a solid line, this should be understood merely as showing that user-data traffic can pass between the MSCs; in practice, whilst a direct connection is used where justified by traffic levels, MSCs may be connected through the intermediary of the fixed public network 13.

In addition to the MSCs 20, user data may also be handled in the NSS by what in GSM parlance is known as a gateway MSC (GMSC) 21. The purpose of the GMSC 21 is to handle calls directed to mobile stations from outside of the PLMN, the GMSC determining where the call should be routed to catch up with the mobile station. In practice, GMSC functionality is often provided at each MSC.

The remaining components of the NSS 10 are concerned with control functions, these components being:

the Home Location Register (HLR) 23—this contains information about subscribers registered with the PLMN (such as the services available to a particular subscriber and the PLMN network address of the MSC where the subscriber is currently located);

the Visitor Location Register (VLR) 24—generally, each MSC has its own associated VLR which holds both subscriber data about users currently visiting the area covered by the MSC, and data about the current location of each user within the MSCs coverage area;

the Authentication Centre (AuC) 25—this component is closely associated with the HLR and holds data providing for subscriber identification and encryption of calls;

the Equipment Identify Register (EIR) 26—this stores information about the mobile stations 12 themselves;

the SMS Gateway 27—in GSM, a special "Short Message Service" is available, this being provided through the SMS Gateway.

Signalling within the NSS 10, over the 'A' Interfaces to the BSSs 11, and with the fixed public network, is effected through signalling links using signalling schemes based on the SS7 standard. In particular, within the NSS 10 the MAP (Mobile Application Part) protocols are used for non-circuit-related signalling traffic and the TUP (Telephone User Part) and ISUP (ISDN User Part) for circuit-related signalling traffic.

The SS7 signalling network is structured as a number of point-to-point links interconnecting nodes at which the various PLMN functional components (MSC, HLR, BSC, etc.) reside. Each such node, or signalling point, has a unique address known as its signalling point code. More than one PLMN functional component may reside at a particular node (for example, each MSC frequently has an associated co-located VLR) and in this case the same point code will be associated with several functional components; it is then the responsibility of the SS7 system to ensure that the messages received at this point code are delivered to the appropriate functional component. The important point to note is that a node may have several different types of associated functionality.

It may also be noted that a node may possess latent functionality in terms of how an associated functional component is designed to respond to particular failure conditions.

Messages traversing the links of the SS7 signalling network may be any of a large number of different types, depending on the nature of the call or action to which the message relates and the function specified by the message.

SS7 ARCHITECTURE

A brief review will next be given of the layered structure of the SS7 architecture and of the format of the messages passed over the links of the signalling network to implement the SS7 architecture for the FIG. 1 network.

Figure 2:
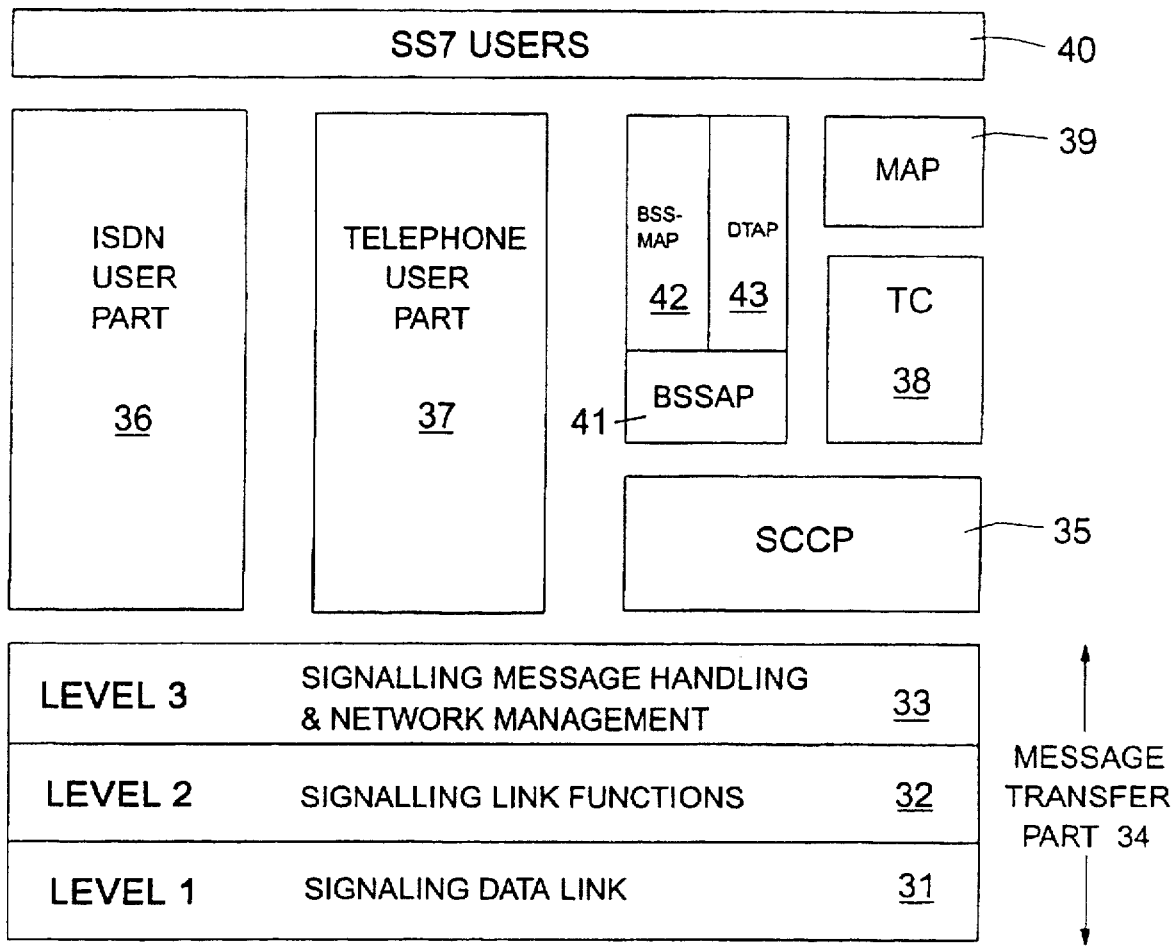
FIG. 2 is a diagram illustrating the basic layered architecture of the SS7 system.

FIG. 2 illustrates the SS7 architecture. Levels 1 to 3 (referenced 31, 33, 33) form the message transfer part (MTP) 34. The MTP 34 is responsible for transferring signalling information between signalling points in messages.

MTP Level 1 (reference 31) defines the physical, electrical and functional characteristics of the transmission path for signalling. MTP Level 2 (reference 32) defines the functions and procedures for the transfer of signalling messages over a link between two directly-connected signalling points. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

MTP Level 3 (reference 33) provides functions for the reliable transfer of signalling information from one signalling end point to another. Thus, Level 3 is responsible for those functions that are appropriate to a number of signalling links, these being separable into signalling-message handling functions and signalling-network management functions. Level 3 related information will therefore include addressing information, this being in the form of point codes.

SS7 Level 4 (not referenced as a whole) includes circuit-related user parts such as ISDN User Part 36 and Telephone User Part 37. These user parts define the meaning of the circuit-related messages transferred by the MTP 34 and provide functionality to the users of SS7 (block 40).

As well as the circuit-related user parts 36 and 37, Level 4 also includes functional elements defining protocols for non-circuit-related information, such as operations, maintenance and administration information, network database information, or subscriber location information for a mobile network. An important functional element in these protocols is the Signalling-Connection-Control Part (SCCP) 35; the SCCP 35 actually forms part of the transfer mechanism for non-circuit-related applications, combining with MTP 34 to provide a transfer mechanism meeting the OSI Layer ¾ boundary requirements. At the level of the SCCP, messages may include addressing information additional to that contained in the Level 3 point codes; in particular, SCCP-level information may include Global Title information for determining a final message destination that may be outside of the local network (in this case, the FIG. 1 PLMN).

On top of the SCCP 35 sits the Transaction Capabilities (TC) 38 above which is a TC Users element 39; in the present case, the element 39 is formed by the Mobile Applications Part (MAP). As is indicated in the FIG. 1, MAP is concerned with a number of protocols (MAP/B, MAP/C, MAP/D, MAP/E, MAP/F, MAP/G) used for communication between the various functional elements of the NSS 10.

Also sitting on top of the SCCP 35 is the Base Station Subsystem Application Part (BSSAP) 41 that defines the protocols used for communication between a BSS 11 and MSC 20 (FIG. 1). BSSAP is divided into two parts, namely a BSS Management Application sub-part (BSSMAP) 42 and a Direct Transfer Application sub-part (DTAP) 43.

Figure 3:
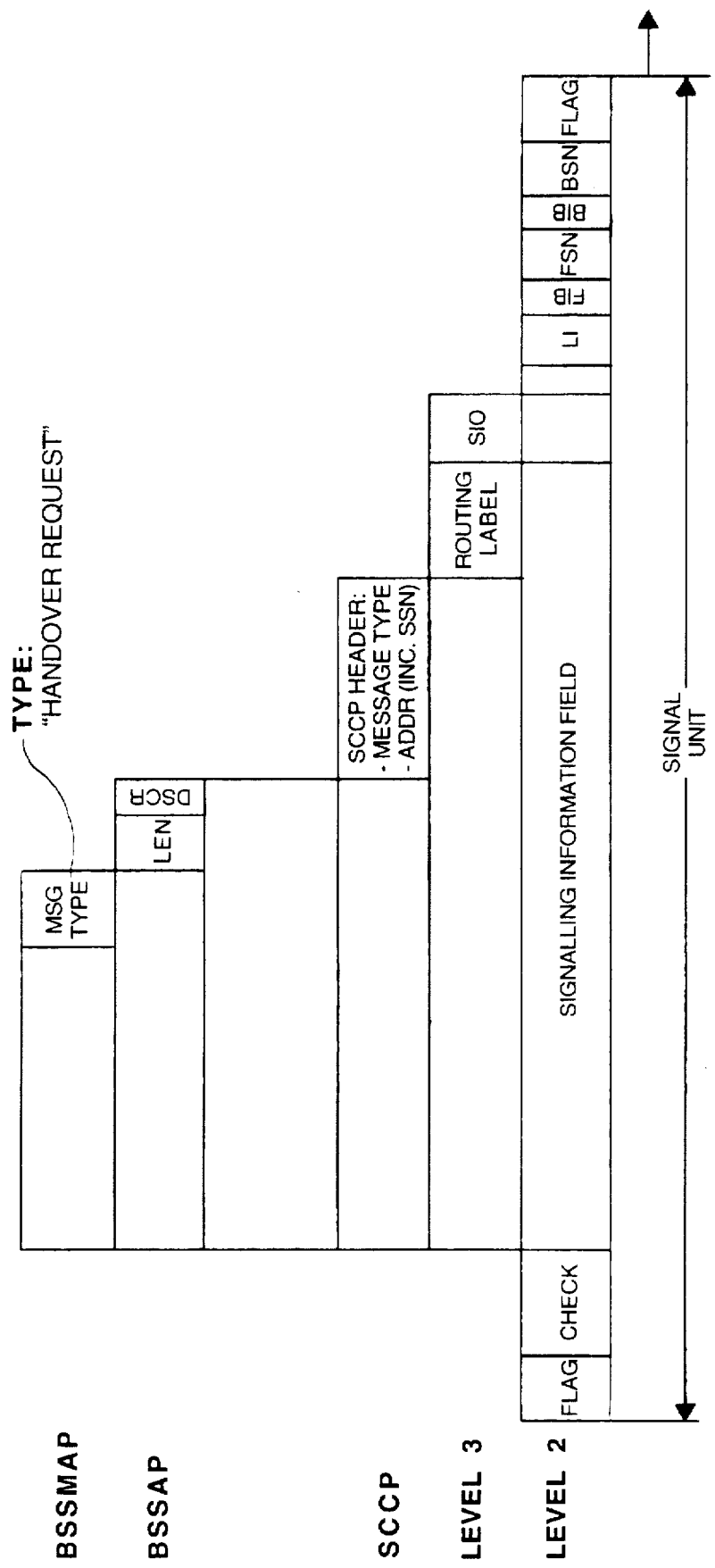
FIG. 3 is a diagram illustrating the composition of an SS7 message.

To illustrate the SS7 message format, an example message will now be considered with reference to FIG. 3, the particular message chosen being a "handover request" message, seen as a BSSMAP message on the 'A' interface between the BSC and MSC concerned.

At MTP Level 2, information is transported in signal units each comprising:

Flag Field (8 bits);
Backward Sequence Number BSN (7 bits);
Backward-Indicator bit BIB (1 bit);
Forward Sequence Number FSN (7 bits);
Forward-Indicator bit (1 bit);
Length Indicator LI (6 bits);
Service Information Octet SIO (8 bits);
Signalling Information Field SIF (8 n bits);
Check Field (16 bits);
Flag Field (8 bits).

In fact, there are three types of signal units, namely Message Signal Units (MSU) that carry all service and application data, Link Status Signal Units (LSSU) that are concerned with link status and thus relate to Level 2 functions, and Fill-In Signal Units (FISU); these different types of signal units are identified by the value of the Length Indicator LI field of each signal unit. In the present example, the LI field indicates that the signal unit is an MSU.

MTP Level 3 information is contained in the SIO and in a routing label forming part of the Level 2 signalling information field. The SIO provides an indication of the nature—User Part or SCCP—of the higher-level information carried in the message; in the present example, SCCP is indicated. The routing label includes originating (source) and destination addresses for the signal unit in terms of point codes; these source and destination point codes relate to the current message hop (which may involve routing via intermediate signalling points). Note, however, that these point codes may not indicate the overall message source and destination in cases where the SCCP Global Title is used for routing (for example, to send the message outside of the local SS7 domain) thereby causing one (or more) intermediate signalling points to examine the Global Title and generate a new routing label (with new source and destination addresses) for the next message hop towards the final destination appropriate for the Global Title concerned. In the present example of a "handover request" message, the source and destination point codes in the routing label do, in fact, indicate the true source and destination of the message, the source being the MSC concerned and the destination the BSC involved in the handover.

Above MTP Level 3 is the SCCP layer for carrying information according to a required service type (connectionless or connection-orientated); the SCCP header information relates to provision of this service as well as specifying further addressing information such as Global Title and sub-system number SSN, this latter being an indication of the nature of the end-user functionality (for example, HLR) to which the message is directed. In the present example, the SSN will be 'FE' in hex, indicating that the message is a BSSAP message exchanged between a BSC and an MSC. However, it should be noted that where a connection-oriented service is established between the source and destination nodes (as with BSSAP message exchanges), the SSN of an individual message in the middle of a dialogue will not be directly available since the normal SCCP addressing information is replaced after connection set up by source and destination reference numbers. Nevertheless, by monitoring the connection request messages (which contain the full SCCP addressing fields), a mapping can be established between the reference number present in a message and the corresponding full addressing information, including the Global Title and SSN associated with the message. In the following, it will be assumed that this mechanism is employed in relation to the monitoring of connection-oriented messages so that SCCP addressing information such as Global Title and SSN is available in respect of each monitored message.

For a BSSAP message, the Global Title information of the SCCP header is irrelevant as BSSAP messages always pass directly between a BSC and MSC. However, it is convenient to note here that where the Global Title information is needed for routing a message, then an associated Global Title Indicator bit (or routing indicator bit) is set in the SCCP header by the originating signalling point; the signalling point receiving the message after its first hop knows from the Global Title Indicator (GTI) bit that it must effect a Global Title translation to identifying the next hop destination of the message. If this next hop destination is to be the final message destination, the GTI bit is reset before the message is sent on.

In the BSSAP layer above the SCCP, a discriminator octet (DSCR in FIG. 3) indicates whether the BSSMAP or DTAP sub-parts are involved. In the present example, it is the BSSMAP sub-part that is involved.

Finally, at the BSSMAP level, the message type is indicated by the value of a message type field, this value being '10' for the current example of a "handover request" message.

OVERVIEW OF NODE-FUNCTIONALITY DISCOVERY

According to the present invention, the functionality existing at one or more nodes of the signalling network is determined by observing the SS7 signalling traffic associated with such node or nodes. More particularly, it is necessary both:

(a) to establish an association between one or more monitored messages and a particular node; and (b) to deduce the functionality of the node of interest from characteristics of the associated monitored messages.

With regard to the first task (a), for the most part the characteristics of a message are indicative of functionality existing at the source node first giving rise to the message and/or at the intended final destination node of the message. For circuit-related traffic, these nodes correspond to those identified by the point codes in the message routing label. However, for non-circuit-related traffic, the point codes in the routing label of a monitored message may not correspond to the true source and destination nodes due to the fact that the message may be subject to global title translation either before or after being monitored. One simple way of overcoming this problem is only to associate a non-circuit-related message with a particular node if:

the message concerned is observed on a link directly connected to the particular node of interest, and the originating/destination point code in the message routing label corresponds to the point code of that node, and the Global Title Indicator bit for the address concerned is not set in the SCCP header.

Certain node functionality may not, however, be associated with the true source and destination nodes of a message but with an intermediate node along the route taken by the message; an example of such functionality is signalling transfer point functionality provided, for example, in US fixed wire AIN networks and serving as signalling gateways between operators. In such cases, node functionality will require looking at selected characteristics of messages passing through the node—however, there is no difficulty in identifying such messages as the point codes in the message routing labels are sufficient for this task.

With regard to task (b)—the determination of node functionality from a set of one or more message characteristics—three different approaches can be identified, though for any given type of node functionality not all approaches may be applicable; these three approaches are as follows:

(i) A set of one or more message characteristics is identified that unambiguously indicates the existence of a particular type of node functionality, the selected characteristics being known all to occur in the same message. This set of characteristics is then searched for in each relevant message taken independently. An example of this type of approach is the identification of MSC functionality by detecting a "handover request" message on an "A" interface; another example is the use of subsystem number to identify HLR functionality.

(ii) A set of two or more message characteristics is identified that unambiguously indicates the existence of a particular type of node functionality; however, the selected characteristics do not all occur in the same message. This set of characteristics is then searched for in the relevant messages and the occurrence of all such characteristics in relation to a particular node is taken to indicate that the node possesses the corresponding type of functionality. An example of this type of approach is the identification of MSC functionality by detecting BSSMAP application parts and TUP/ISDN user parts associated with the same node.

(iii) The transfer characteristics of a node may be examined to see if there is a consistent difference between inbound and outbound messages betraying some functionality possessed by the node. For example, if the number of inbound messages with the GTI bit set significantly exceeds the number of outbound messages with the GTI bit set, then this indicates that the node concerned is effecting global title translation (and may therefore possesses STP functionality this would almost certainly be the case if the node was not a source or sink of voice-related traffic).

Whilst approach (i), and in certain cases approach (ii), can be done using observations on a single link, generally approach (ii) and always approach (iii) requires the collation and analysis of observations made on several links. In fact, it is also useful for approach (i) to compare results obtained from observations made on different links to check for consistency.

IMPLEMENTATION OF NODE-FUNCTIONALITY DISCOVERY METHOD

In the present embodiment, monitor probes 50 (see FIG. 1) are connected into selected ones of the signalling links and these probes are arranged to feed back the results of their observations to a central station 51 over a communications network 52. For clarity, in FIG. 1 the monitor probes are shown as black triangles with only some of the probes being referenced and only one having its connection to the station 51 shown. An SS7 link is arranged as two oppositely directed channels and each probe 50 is arranged to monitor both channels of the link in which it is inserted.

The processing of each message monitored by a probe 50 will now be described with reference to FIG. 4. It is assumed that the probe knows the point codes of the nodes at the ends of the link it is monitoring; such information may be externally provided at the time of probe installation or may be determined by the probe itself according to the method described in our above-mentioned patent application.

For each link-end node as represented by its point code, the probe maintains a record 56 for holding functionality-related information determined for the node concerned. This record 56 has three functionality-related fields 57, 58, 59 each for holding information determined according to a respective one of the three approaches discussed above. Thus the "function" field 57 holds the identity of particular functionality uniquely identified from the examination of one message; this field is a bitmap 57 with the setting of each bit representing the possession of a corresponding predetermined functionality by the node concerned. The "parts" 58 field serves to collect information on the user and application parts of messages sent to the node concerned, this information being intended to be considered cumulatively with information from other probes to enable node functionality to be determined according to the second approach discussed above; the "parts" field 58 is also a bitmap with each bit being indicative of the presence or absence of a particular user/application part associated with the node concerned. Finally, the "xfer" field 59 is used to contain transfer characteristic information on the node concerned; in the present case this information takes the form of counts of inbound and outbound messages having the GTI bit set, these counts being held in respective sub-fields.

Figure 4:
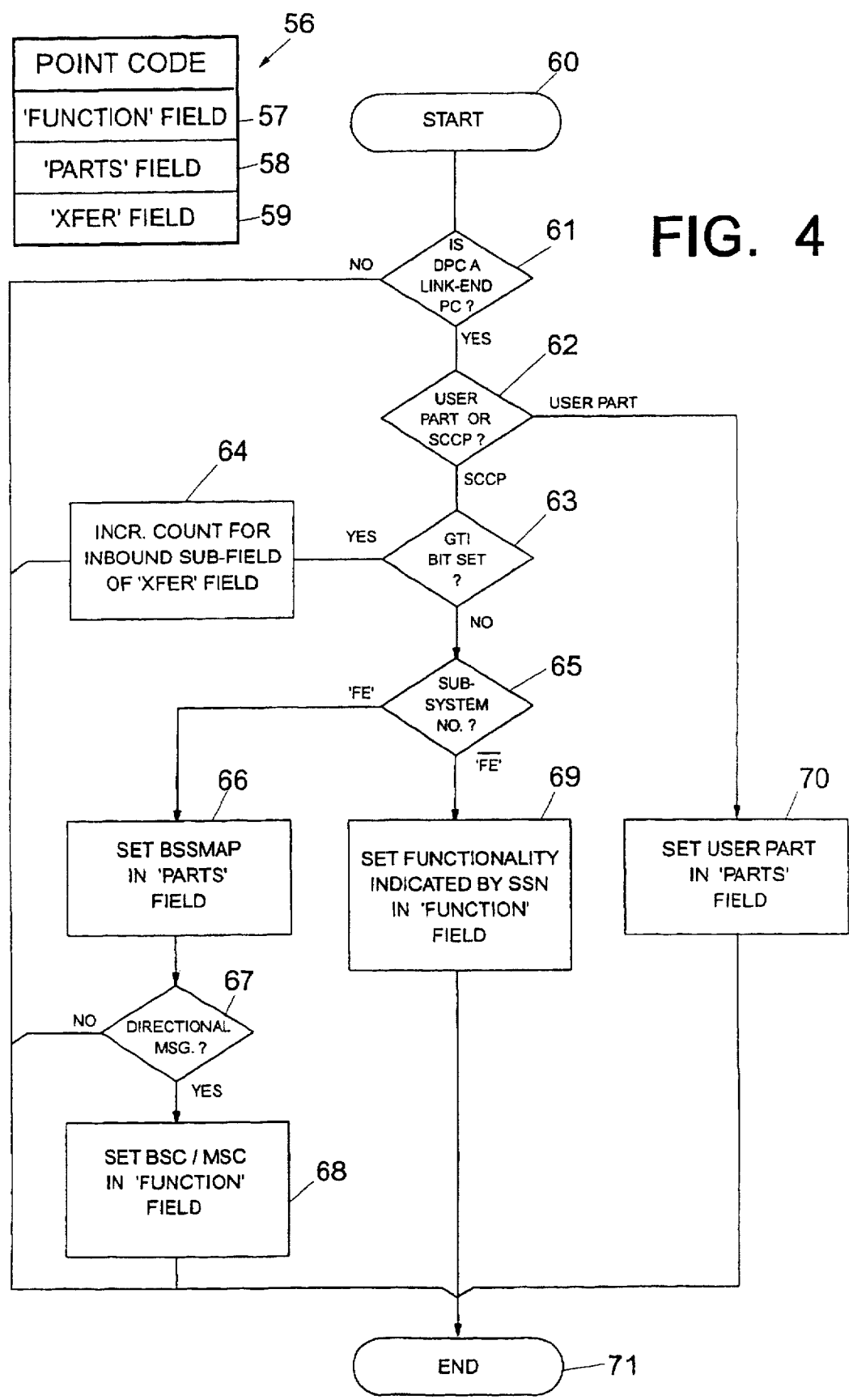
FIG. 4 is a flow chart illustrating the processing of information from a monitored SS7 message in order to extract node-functionality information therefrom in relation to the node indicated by the destination point code in the routing label of the message.

Upon a message being monitored by the probe 50, the processing represented in FIG. 4 is initiated (block 60). The destination point code DPC in the message routing label is first checked to see if it corresponds to one of the link-end point codes; if it does not, FIG. 4 processing is terminated (block 61). If the DPC does correspond to a link-end point code, the SIO is looked at to see if the message carries a user part TUP or ISUP, or non-circuit related information i.e. is SCCP based (see block 62). Where a user part is identified, the nature of this user part is recorded in the "parts" field 58 of the record held for the node identified by the DPC (block 70) after which the FIG. 4 processing is terminated (block 71); where an SCCP-based message is identified, processing passes to block 63.

In block 63, a check is made on the Global Title Indicator bit for the destination address in the SCCP header. If the GTI bit is set, the message is only used for collecting transfer characteristic information—in particular, the count held in the inbound subfield of field 59 of the record corresponding to the message DPC is incremented (block 64) after which FIG. 4 processing is terminated (block 71). On the other hand, if the GTI bit is not set, the message is further examined to extract functionality-related information according to the first and/or second approaches referred to above. To this end, the subsystem number SSN of the message is next examined (block 65).

Generally, the SSN will by itself indicate a type of functionality existing at the final destination node of the message; however, for messages on an "A" link, a subsystem number of "FE" (hex) indicates the BSSMAP application part and is thus carried both by messages going from the BSC concerned to the corresponding MSC and messages going from the MSC to the BSC. Accordingly, if an SSN other than "FE" is detected, the corresponding functionality is recorded in the "function" field of the DPC's record (block 69), whereas if an SSN of "FE" is detected the "parts" field of the DPC's record is updated to note the association of the BSSMAP application part with the node represented by the DPC (block 66).

In fact, for BSSMAP messages, specific node functionality for the DPC can usually be determined by detailed examination of message type since many of the messages on the "A" interface are uni-directional. For example, "handover request" messages only pass from a BSC to an MSC so that detection of such a message (block 67) permits the functionality of the DPC node to be determined and the "function" field 57 of the corresponding record set accordingly (block 68).

FIG. 4 concerns message processing for extracting functionality information relevant to the node represented by the DPC in the routing label. Similar processing may thereafter be effected to extract functionality information for the node represented by the originating point code OPC in the message routing label. Again, if the GTI bit is set in relation to the source address in the SCCP header, then the message is only used for collecting transfer characteristic information - in particular, the count held in the outbound subfield of field 59 of the record corresponding to the message OPC is incremented (block 64). It should also be notrd that subsystem number relates to the destination node of a message and so is not directly useful in determining source node functionality.

Figure 5:
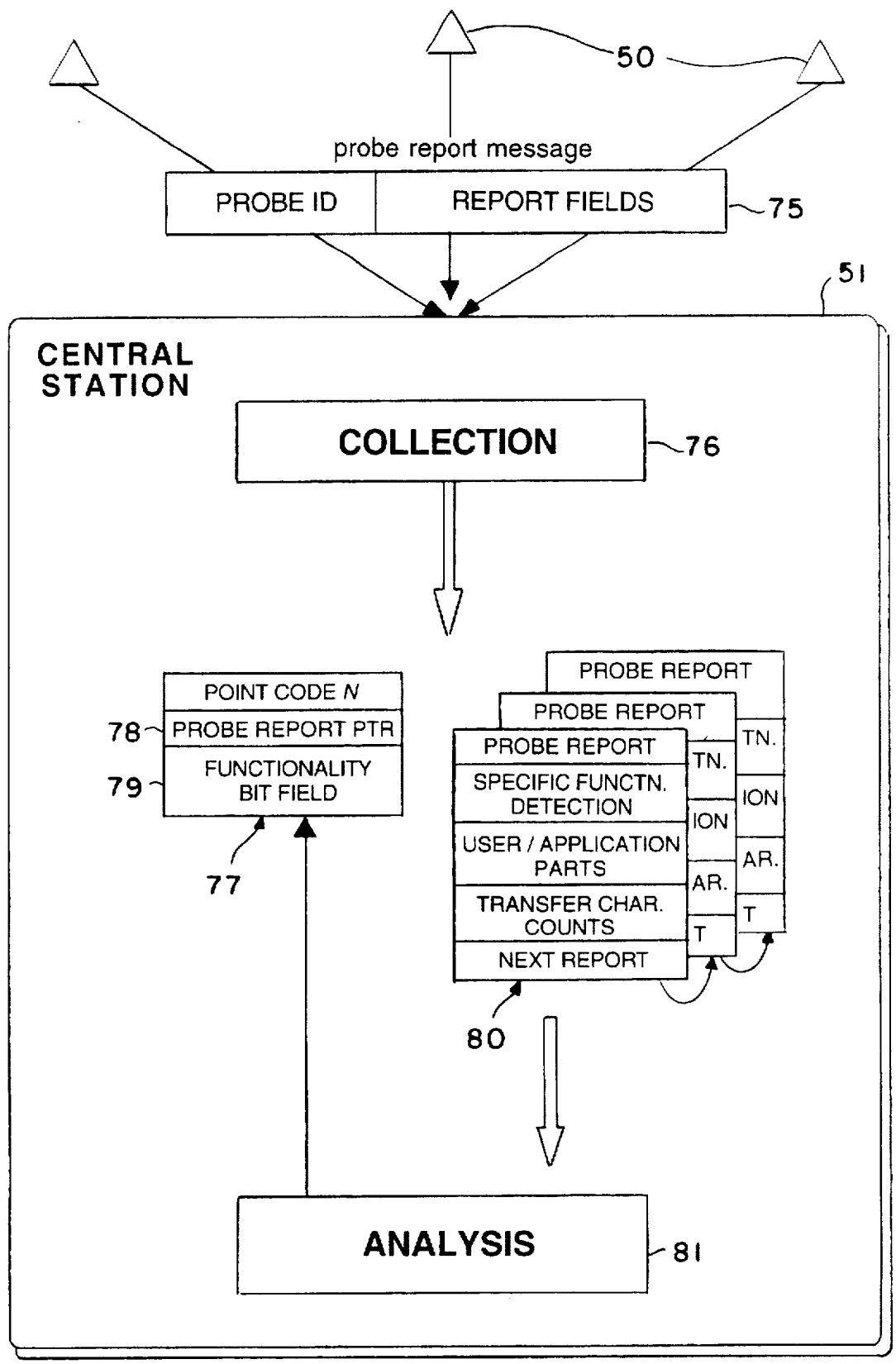
FIG. 5 is a diagram illustrating the overall collection and processing of node functionality information from a number of monitor probes.

Each probe 50 collects functionality information on its link-end nodes over a period of time and peridically sends this information to the central station 75 in a probe report message 75 (see FIG. 5). Each such message includes the identity of the probe and the records 56 for the two link-end nodes associated with the probe. The central station collects and organises the probe information (step 76) as illustrated in FIG. 6; in particular, station 51 maintains a record 77 for each point code of which it is aware and then associates with this record 77 (through pointer 78) a linked list of the probe report sections 80 relevant to the point code concerned. Thus, if three links associated with a particular point code are monitored by probes 50, the three records 56 generated in the probes will be organised in the central station 51 such that each resides in a respective report section 80 and such sections are linked through pointers with each other and with the corresponding record 77.

Either periodically or upon operator request, the central station 51 carries out for each point code an analysis of the functionality information held in the report sections 80 for that point code (step 81, FIG. 6). This analysis will involve:

combining the specific functionalities contained in the "function" fields of the report sections 80;

combining the user-part/application-part information contained in the "parts" fields of the report sections 80 and then analysing this information to see if it contains a set of parts predetermined as being characteristic of a particular node functionality;

combining the inbound counts, and separately the outbound counts, held in the "xfer" fields of the report sections 80 and then comparing these counts to see if there are significantly more inbound counts than outbound counts; if this were the case, then the node can be considered as effecting global title translation and this could be combinrd with other information to deduce a particular node functionality (thus, although not applicable to the FIG. 1 network, if the node concerned was also found not to be a source or sink of voice related traffic, it would be reasonable to deduce that the node had STP functionality).

The totality of the functionality types determined for the node concerned are then written back into a functionality bit field 79 of the point code record 77, thereby making the information readily available against node identity.

It will be appreciated that the foregoing gives only a limited set of examples of what is possible. Other examples of functionality detection are:

in a GSM network, detecting VLR and HLR functionality by monitoring for the MAP/D "Update Location" that will only pass from a VLR to an HLR;

in a GSM network, detecting HLR functionality by determining the destination node for "Send Routing Information" messages;

in a GSM network, finding Gateway MSC functionality by identifying the source of "Send Routing Information" messages (such a source should also be the source and sink of voice related signalling);

in a PCS network, finding a Mobile Access Tandem MAT as being a source and sink of voice related traffic whilst not having any BSC attached to it (as indicated by the absence of associated BSSMAP messages).

It will appreciated that many variants are possible to the foregoing node-functionality discovery method. Thus, for example, it is not necessary to exclude from processing at a node these messages that have neither a source or a destination point code corresponding to a link-end point code.

We claim:

1. A discovery method for determining information about a communications system that includes a plurality of nodes and a signalling network with point-to-point links interconnecting said nodes, the nodes having respective network addresses on the signalling network and each having at least one of a plurality of different types of high-level node functionality, and the links serving to carry messages that are associated with different ones of said types of node functionality and have characteristics dependent thereon, said messages also including addressing information associating the messages with specific nodes, said method involving:

(a). passively monitoring at least one said link to detect messages passed thereacross between said nodes during operation of the signalling network;

(b). deriving from at least one of the messages that was detected in step (a) and is associated with particular said node, a predetermined set of message characteristics sufficient to identify a type of node functionality possessed by said particular node a, message being determined as being associated with said particular node by reference to addressing information of the message concerned; and (c). providing an output associating said particular node with the type of functionality identified by said set of characteristics derived in step (b).

2. A method according to claim 1, wherein said predetermined set of message characteristics is derived from one of said messages.

3. A method according to claim 2, wherein said particular node constitutes the final destination node of said one of said message according to said addressing information.

4. A method according to claim 2, wherein said particular node constitutes the originating source node of said one of said message according to said addressing information.

5. A method according to claim 3, wherein said network is an SS7 signalling network, said predetermined set of message characteristics comprising a predetermined sub-system number in the SCCP layer of said message.

6. A method according to claim 3, wherein said network is an SS7 signalling network, said predetermined set of message characteristics comprising a predetermined type of message component of said message.

7. A method according to claim 6, wherein said network forms the signalling network of a GSM system, said predetermined message component being a BSSMAP or MAP message component.

8. A method according to claim 1, wherein said predetermined set of message characteristics comprises characteristics derived from a plurality of different messages.

9. A method according to claim 8, wherein said network is an SS7 signalling network, said set of message characteristics comprising user and application parts with which the messages of said plurality of messages are associated.

10. A method according to claim 1, wherein said predetermined set of message characteristics is derived from messages going to and coming from said particular node, said set of message characteristics being indicative of a transfer characteristic of that node which in turn is indicative of the said type of node functionality possessed by said particular node.

11. A method according to claim 1, wherein said predetermined set of message characteristics is derived from messages monitored on at least one said link directly connected to said particular node.

12. A method according to claim 11, wherein said at least one message associated with said particular node is one of:

a message having said particular node as its final destination node, a message having said particular node as its originating source node.

13. A method according to claim 12, wherein said network is an SS7 signalling network and wherein a said message is identified as having a required association with said particular node by checking that:

the message has as its originating/destination point code the point code of a node at one end of the link on which the message is monitored, and where the message has an SCCP component, the Global Title translation indicator of the message is not set.

14. A method according to claim 4, wherein said network is an SS7 signalling network, said predetermined set of message characteristics comprising a predetermined sub-system number in the SCCP layer of said message.

15. A method according to claim 4, wherein said network is an SS7 signaling network, said predetermined set of message characteristics comprising a predetermined type of message component of said message.

16. A method according to claim 1 wherein the monitoring step occurs independently of normal signalling operations performed by said signalling network.

* * * * *

UNITED STATES PATENT AND TRADEMARK OFFICE
CERTIFICATE OF CORRECTION

PATENT NO : 5,793,752
DATED : August 11, 1998
INVENTOR(S): Clarke et al.

It is certified that error appears in the above-identified patent and that said Letters Patent are hereby corrected as shown below:

Claim 1, Line 19     Change "node a," to --node, a--.

Claim 3, Line 3, Change "message" to --messages--.
Claim 4, Line 3     Change "message" to --messages--.

Signed and Sealed this

Twenty-first Day of November, 2000

Attest:

Q. TODD DICKINSON

Attesting Officer

Director of Patents and Trademarks